(12) United States Patent
Minoshima et al.

(10) Patent No.: US 9,272,729 B2
(45) Date of Patent: Mar. 1, 2016

(54) STEERING DEVICE FOR VEHICLE

(71) Applicant: HITACHI CONSTRUCTION MACHINERY CO., LTD., Tokyo (JP)

(72) Inventors: Toshikazu Minoshima, Ushiku (JP); Yuusuke Shibue, Noda (JP); Yohei Nakate, Tsuchiura (JP); Takanobu Ikari, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/370,273

(22) PCT Filed: Feb. 12, 2013

(86) PCT No.: PCT/JP2013/053224
§ 371 (c)(1),
(2) Date: Jul. 2, 2014

(87) PCT Pub. No.: WO2013/129090
PCT Pub. Date: Sep. 6, 2013

(65) Prior Publication Data
US 2014/0367189 A1    Dec. 18, 2014

(30) Foreign Application Priority Data

Feb. 29, 2012    (JP) .................................. 2012-043375

(51) Int. Cl.
*B62D 5/09*    (2006.01)
*B62D 5/06*    (2006.01)
*B62D 15/02*   (2006.01)
*B62D 6/00*    (2006.01)

(52) U.S. Cl.
CPC .. *B62D 5/09* (2013.01); *B62D 5/06* (2013.01); *B62D 6/008* (2013.01); *B62D 15/021* (2013.01)

(58) Field of Classification Search
CPC ............ B62D 5/06; B62D 5/09; B62D 6/008; B62D 15/021; B62D 15/023
See application file for complete search history.

(56) References Cited

U.S. PATENT DOCUMENTS 4,869,335 A * 9/1989 Takahashi .................... 180/412
5,014,801 A * 5/1991 Hirose .......................... 180/412
5,032,996 A * 7/1991 Shiraishi ........................ 701/41

(Continued)

FOREIGN PATENT DOCUMENTS

EP        0 983 928 A1    3/2000
JP        61-081278 A     4/1986

(Continued)

*Primary Examiner* — Joseph Rocca
*Assistant Examiner* — Gabriela C Craciun
(74) *Attorney, Agent, or Firm* — Mattingly & Malur, PC

(57) ABSTRACT

Front wheels (6L, 6R) a steering operation of which is possible by a steering mechanism (12) are mounted on a vehicle body (2). Steering cylinders (22L, 22R) of the steering mechanism (12) extend and contract in response to an operation of a steering handle (27) provided in a cab (5) to perform the steering operation of the front wheels (6L, 6R). The steering mechanism (12) is provided with a rotation angle sensor (28) for detecting a steering angle θ of the left front wheel (6L) and a proximity switch (29) for detecting whether or not the front wheel (6L) is in a straight-ahead state. A controller (30) determines that the rotation angle sensor (28) or the proximity switch (29) is abnormal when the steering angle (θ) detected by the rotation angle sensor (28) is different from the detection result by the proximity switch (29).

6 Claims, 9 Drawing Sheets

(56) References Cited

U.S. PATENT DOCUMENTS

| | | | | |
|---|---|---|---|---|
| 5,139,105 | A * | 8/1992 | Frost et al. | 180/415 |
| 6,779,624 | B2 * | 8/2004 | Goto et al. | 180/403 |
| 2001/0013368 | A1 * | 8/2001 | Igawa et al. | 137/625.23 |
| 2005/0067199 | A1 * | 3/2005 | Shimizu | 180/65.1 |
| 2006/0022420 | A1 * | 2/2006 | Pressler et al. | 280/93.512 |
| 2007/0282558 | A1 * | 12/2007 | Sagisaka | 702/116 |
| 2008/0018072 | A1 * | 1/2008 | Manken et al. | 280/92 |
| 2009/0033053 | A1 * | 2/2009 | Markiton et al. | 280/93.5 |
| 2010/0307857 | A1 * | 12/2010 | Shinagawa | 180/421 |
| 2012/0247864 | A1 * | 10/2012 | Kubo et al. | 180/422 |
| 2014/0182277 | A1 * | 7/2014 | Kuipers et al. | 60/327 |
| 2014/0214278 | A1 * | 7/2014 | Kuipers et al. | 701/42 |

FOREIGN PATENT DOCUMENTS

| | | |
|---|---|---|
| JP | 03-061770 A | 3/1991 |
| JP | 05-155344 A | 6/1993 |
| JP | 10-316000 A | 12/1998 |
| JP | 11-059447 A | 3/1999 |
| JP | 2006-035917 A | 2/2006 |
| JP | 2009-143427 A | 7/2009 |
| JP | 2009-262750 A | 11/2009 |
| JP | 2010-120465 A | 6/2010 |
| WO | 2011/083627 A1 | 7/2011 |

* cited by examiner

STEERING DEVICE FOR VEHICLE

TECHNICAL FIELD

The present invention relates to a steering device for vehicle that is mounted on a transporter vehicle such as a dump truck and is used suitably in steering a vehicle.

BACKGROUND ART

In general, a large-sized transporter vehicle called a dump truck is provided with a liftable vessel (loading platform) on a frame of a vehicle body. The dump truck travels in a state where objects to be transported, which are composed of crushed stones or sand and earth, are loaded in a large quantity on the vessel (Patent Document 1).

A transporter vehicle of this type according to the conventional art comprises an automotive vehicle body, a loading platform that is provided on the vehicle body in such a manner as to be tiltable (liftable) thereon and on which objects to be transported are loaded, and a cab that is positioned in front of the loading platform and is provided in the vehicle body to define an operator's room therein. A steering handle is provided in the cab of the transporter vehicle, which an operator grips to steer a travelling direction of the vehicle.

The transporter vehicle according to the conventional art is equipped with a steering device called a power steering apparatus configured to perform a steering operation of a vehicle using a hydraulic force for being able to assist in a handle operation of an operator. This steering device comprises a steering handle, a steering valve for controlling supply and discharge of pressurized oil in response to an operation of the steering handle, and a steering cylinder for steering the vehicle by the pressurized oil supplied/discharged through the steering valve (Patent Document 2).

Recently, information concerning a steering angle of a steering wheel is required for adopting a posture control system of a vehicle, a parking assistance system for automatically steering a steering handle, and the like. There is known the configuration of detecting an operation angle of a power steering to meet this requirement (Patent Document 3). On the other hand, there is also known the configuration of detecting a position of the steering by a plurality of detectors (Patent Document 4).

PRIOR ART DOCUMENT

Patent Document

Patent Document 1: Japanese Patent Laid-Open No. 2009-262750 A
Patent Document 2: Japanese Patent Laid-Open No. Hei 5-155344 A
Patent Document 3: Japanese Patent Laid-Open No. Hei 11-59447 A
Patent Document 4: Japanese Patent Laid-Open No. Hei 10-316000 A

SUMMARY OF THE INVENTION

Incidentally, a power steering mechanism for a passenger car has the structure that steering wheels are mechanically connected to a steering handle through a rack, a pinion and the like. On the other hand, in a large-sized dump truck, a power steering mechanism is configured by a steering valve and a steering cylinder. Therefore, even if an angular sensor is attached to the steering handle, a steering angle of a steering wheel cannot be detected. Therefore, it is necessary to attach a steering angle sensor to, for example, an axle of the steering wheel for directly detecting the steering angle of the steering wheel.

In this case, since the sensor is attached near the steering wheel, there is a tendency that it is more difficult to secure reliability as compared to a case where the sensor is attached in a vehicle compartment, for example, near the steering handle. On the other hand, as to the information of the steering angle of the steering wheel, high reliability is required because of use of the information in the posture control of the vehicle.

Therefore, there is thought a method where a plurality of steering angle sensors are provided for multiplexing to detect a steering angle. However, in a case where the multiplexing is made using the same steering angle sensors, in a vehicle such as a dump truck that is used in sites where climate conditions such as ambient temperatures and humidity or loading environments such as earth and sand, and dust are greatly different, there is a problem that defects of the steering angle sensors tend to easily occur together by influences of these climate conditions or loading environments The present invention is made in view of the foregoing problems and an object of the present invention is to provide a steering device for vehicle that can obtain information concerning a steering angle of a steering wheel with high reliability.

(1) The present invention is applied to a steering device for vehicle comprising: a steering handle for an operator to perform a steering operation of a steering wheel; a steering valve for controlling supply and discharge of pressurized oil in response to an operation of the steering handle; and a steering cylinder for steering the vehicle by the pressurized oil supplied/discharged through the steering valve.

The configuration adopted by the present invention is characterized in that: a steering angle detecting unit configured to detect a steering angle of the steering wheel; a straight-ahead state detecting unit configured to determine whether or not the steering wheel is in a straight-ahead state on condition that the vehicle can take a straight-ahead driving; and an abnormality determining unit configured to, when the steering angle detected by the steering angle detecting unit is different from the detection result by the straight-ahead state detecting unit, determine that at least one of the steering angle detecting unit and the straight-ahead state detecting unit is abnormal.

With this arrangement, the steering angle of the steering wheel is detected by the steering angle detecting unit and it is determined whether or not the steering wheel is in the straight-ahead state by the straight-ahead state detecting unit. Here, the steering angle in which the steering wheel becomes in the straight-ahead state can be in advance obtained. Therefore, when the steering angle detected by the steering angle detecting unit is within a range of the straight-ahead state it is detected that the vehicle is in the straight-ahead state by the straight-ahead state detecting unit, it is estimated that any of the steering angle detecting unit and the straight-ahead state detecting unit operates normally. In addition, also when the steering angle detected by the steering angle detecting unit is out of a range of the straight-ahead state it is detected that the vehicle is in a non-straight-ahead state by the straight-ahead state detecting unit, it is estimated that any of the steering angle detecting unit and the straight-ahead state detecting unit also operates normally. That is, in this case, it is estimated that a vehicle travels along a curve in an indirect road.

On the other hand, when the steering angle detected by the steering angle detecting unit is out of the range of the straight-ahead state it is detected that the vehicle is in the straight-ahead state by the straight-ahead state detecting unit, there is a possibility that at least one of the steering angle detecting unit and the straight-ahead state detecting unit is in an abnormal state in which the one thereof does not operate normally. In addition, when the steering angle detected by the steering angle detecting unit is in the range of the straight-ahead state it is detected that the vehicle is in the non-straight-ahead state by the straight-ahead state detecting unit, there is a possibility that at least one of the steering angle detecting unit and the straight-ahead state detecting unit is in the abnormal state.

Therefore, the abnormality determining unit determines that at least one of the steering angle detecting unit and the straight-ahead state detecting unit is abnormal when the steering angle detected by the steering angle detecting unit is different from the detection result by the straight-ahead state detecting unit. When the abnormality determining unit determines that the one thereof is abnormal, a unit such as a warning or a lamp can be used to inform an operator of the determination result, and it is possible to perform recording of various protection operations or abnormality operations. As a result, the steering angle detecting unit and the straight-ahead state detecting unit that are different in kind from each other cab be used to determine the abnormality of each other and obtain information of the steering angle of the steering wheel with high reliability.

(2) According to the present invention, the straight-ahead state detecting unit determines that the steering wheel is in the straight-ahead state when the steering angle of the steering wheel is within a range until a certain boundary value in advance determined; and the abnormality determining unit does not perform an abnormality determination when the steering angle detected by the steering angle detecting unit is within a range of a dead zone including the boundary value, and performs the abnormality determination when the steering angle detected by the steering angle detecting unit is out of the range of the dead zone.

With this arrangement, the determination result of the straight-ahead state detecting unit is different from the determination result of the steering angle detecting unit due to a detection error of each other when the steering angle of the steering wheel is in the vicinity of the boundary value. Therefore, there is a possibility that a determination on whether to be abnormal is erroneously made. On the other hand, the abnormality determining unit does not perform the abnormality determination when the steering angle detected by the steering angle detecting unit is within the range of the certain dead zone including the boundary value, and performs the abnormality determination when the steering angle detected by the steering angle detecting unit is out of the range of the dead zone. Therefore, the erroneous determination based upon the straight-ahead state detecting unit or the steering angle detecting unit can be prevented and the abnormality of the straight-ahead state detecting unit or the steering angle detecting unit can be accurately determined.

(3) According to the present invention, the vehicle is provided with the steering wheels to the left and right, the steering angle detecting unit is composed of a rotation angle sensor for detecting a steering angle of one of the left and right steering wheels, and the straight-ahead state detecting unit is composed of a proximity switch for detecting whether or not the steering wheel is in the straight-ahead state, the proximity switch being provided in the same steering wheel side as the rotation angle sensor.

With this arrangement, since the rotation angle sensor that is the steering angle detecting unit and the proximity switch that is the straight-ahead state detecting unit are both provided in the same steering wheel in the left and right steering wheels, the rotation angle sensor and the proximity switch perform detection of the steering angle of the steering wheel and detection on whether or not the same steering wheel is in the straight-ahead state. Therefore, it is possible to reduce a detection error between the rotation angle sensor and the proximity switch to be small to restrict the erroneous determination based upon the detection error.

(4) According to the present invention, the abnormality determining unit determines that there is the abnormality when the steering angle detected by the steering angle detecting unit and the detection result by the straight-ahead state detecting unit continue to differ over a predetermined time.

With this arrangement, in a case where a state where the steering angle that is detected by the steering angle detecting unit and corresponds to an actual traveling state and the detection result on whether or not the steering wheel is in the straight-ahead traveling state by the straight-ahead state detecting unit differ continues over the predetermined time or in a case where a state where the steering angle that is detected by the steering angle detecting unit and the detection result on whether or not the steering wheel is in the straight-ahead traveling state by the straight-ahead state detecting unit and corresponding to the actual traveling state differ continues over the predetermined time, at least one of the steering angle detecting unit and the straight-ahead state detecting unit can be determined to be abnormal.

(5) According to the present invention, the vehicle is provided with the steering wheels to the left and right, the steering angle detecting unit is composed of a rotation angle sensor for detecting a steering angle of one of the left and right steering wheels, and the straight-ahead state detecting unit is composed of a proximity switch for detecting whether or not the other of the steering wheels is in the straight-ahead state, the proximity switch being provided in a different steering wheel side from the rotation angle sensor.

With this arrangement, since the rotation angle sensor that is the steering angle detecting unit and the proximity switch that is the straight-ahead state detecting unit each are provided in the steering wheels that are different from each other in the left and right steering wheels, the rotation angle sensor and the proximity switch each perform, on the steering wheels that are different from each other, detection of the steering angle of one steering wheel and detection on whether or not the other steering wheel is in the straight-ahead state. Therefore, since it is possible to dispose the rotation angle sensor and the proximity switch to be away from each other, for example, even when flying stones, sand and earth, and the like collide with the vicinity of the steering wheel, it is possible to prevent the rotation angle sensor and the proximity switch from being abnormal together, thus enhancing the reliability of the abnormality determination. In addition, also when a link mechanism for jointing the left and right steering wheels is in failure, since the steering angle detected by the steering angle detecting unit and the detection result by the proximity sensor differ, it is possible to detect the failure of the link mechanism.

(6) According to the present invention, a steering mechanism for steering the steering wheel is composed of a trailing arm having a base side attached to a vehicle body of the vehicle, a spindle that is attached to a tip side of the trailing arm to be rotatable in a front-rear direction to rotatably support the steering wheel, a knuckle arm that is provided in the spindle, and the steering cylinder that is provided between the knuckle arm and the trailing arm to rotate the spindle to the trailing arm, wherein the steering angle detecting unit is composed of a rotating part rotating together with the spindle, and a fixing part that is fixed to the side of the trailing arm to detect a rotating displacement between the rotating part and the fixing part.

With this arrangement, it is possible to detect the rotation angle of the spindle to the trailing arm by the rotating displacement between the rotating part and the fixing part of the steering angle detecting unit, and it is possible to detect the steering angle of the steering wheel that is rotatably supported by the spindle.

(7) According to the present invention, the straight-ahead state detecting unit is composed of a detecting part that is attached to the side of the trailing arm, and a detecting plate that rotates together with the spindle and has a length corresponding to an angle range of the steering angle in which the steering wheel is in the straight-ahead state, wherein the detecting plate opposes the detecting part when the steering wheel become in the straight-ahead state, and is away from a position opposing the detecting part when the steering wheel becomes in a non-straight-ahead state.

With this arrangement, while the detecting plate of the straight-ahead state detecting unit opposes the detecting part, it is possible to detect that the steering wheel is in the straight-ahead state, and while the detecting plate of the straight-ahead state detecting unit does not oppose the detecting part, it is possible to detect that the steering wheel is not in the straight-ahead state.

(8) According to the present invention, a steering device for vehicle is composed of an automotive vehicle body provided with front wheels and rear wheels, a loading platform that is provided on the vehicle body in such a manner as to be tiltable thereon by using a rear side thereof as a fulcrum and on which objects to be transported are loaded, a cab that is positioned in front of the loading platform and is provided in the vehicle body to define an operator's room therein, and a hoist cylinder that is provided between the loading platform and the vehicle body to incline the loading platform backward at the time of discharging the object to be transported from the loading platform, wherein the steering handle is provided in the cab, the front wheel acts as the steering wheel a steering angle of which changes by the steering cylinder, and the steering valve is provided in the vehicle body.

With this arrangement, the steering device for vehicle in the present invention can be applied, for example, to a large-sized dump truck in which the steering handle and the steering wheel are not mechanically jointed, and even when the steering angle of the steering handle is not necessarily in accordance with the steering angle of the steering wheel, it is possible to obtain the information of the steering angle of the steering wheel with high reliability.

MODE FOR CARRYING OUT THE INVENTION

Figure 1:
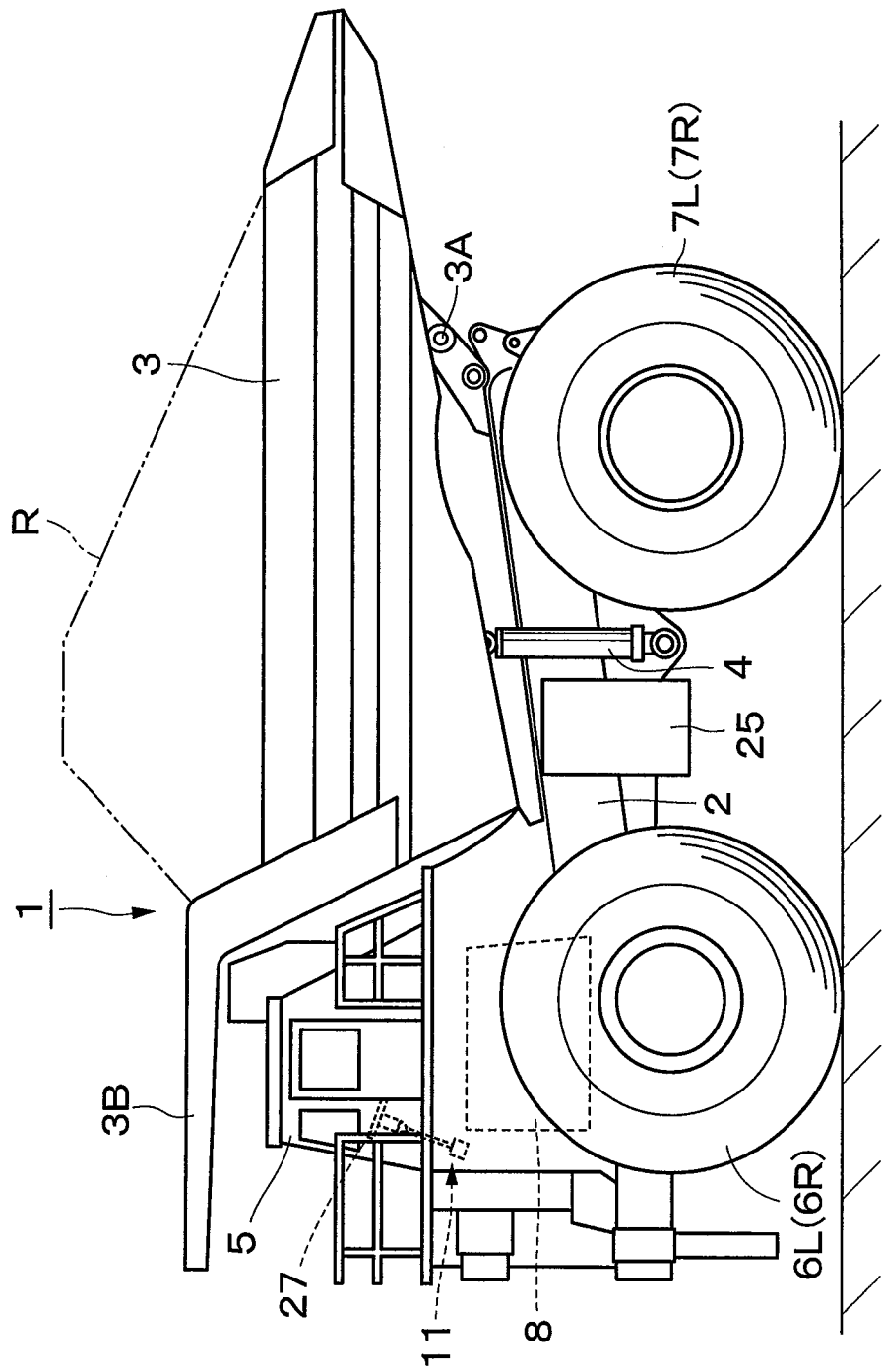
FIG. 1 is a front view showing a dump truck to which a steering device according to a first embodiment in the present invention is applied.

Hereinafter, an embodiment of a steering device for vehicle according to the present invention will be in detail explained with reference to the accompanying drawings by taking a case where the steering device for vehicle is applied to a dump truck transporting crushed stones excavated in a mine and the like as an example.

FIG. 1 to FIG. 8 show a steering device for vehicle according to a first embodiment. It should be noted that in the present embodiment, there is exemplified a case where a rotation angle sensor 28 and a proximity switch 29, which will be described later, are provided in the side of a left front wheel 6L as the same steering wheel.

In the figure, designated at 1 is a dump truck in which a steering device for vehicle is used, and the dump truck 1 is a large-sized transporter vehicle that is configured schematically by a vehicle body 2, a vessel 3, a cab 5, front wheels 6L and 6R, rear wheels 7L and 7R and the like.

The vehicle body 2 forms a frame structure. The vessel 3 used as a loading platform is mounted on an upper side of the vehicle body 2 to be capable of being tilted (lifted) on a basis of a rear side of the vehicle body 2 as a fulcrum.

The vessel 3 is formed as a large-sized container whose overall length reaches as much as 10 to 13 meters to load a large volume of objects to be transported such as crushed stones (hereinafter, called crushed stones R). A rear side bottom portion of the vessel 3 is tiltably coupled to a rear end side of the vehicle body 2 by using a connecting pin 3A. In addition, a protector 3B is integrally provided on a front side top portion of the vessel 3 in such a manner as to cover the cab 5 to be described later from an upper side thereof. The front portion side (protector 3B side) of the vessel 3 is rotated in an upper-lower direction (raised or lowered) by the use of the connecting pin 3A as a fulcrum by extending or contracting a hoist cylinder 4 to be described later.

The hoist cylinder 4 is provided between the vehicle body 2 and the vessel 3 in a state of being capable of extending/contracting. The hoist cylinder 4 is provided in each of the left and right sides of the vehicle body 2 (only one piece thereof is shown in FIG. 1).

The cab 5 is provided in an upper side of a front portion of the vehicle body 2 to be located at the front side of the vessel 3. The cab 5 defines therein an operator's room where an operator of the dump truck 1 gets in/off. An operator's seat, an engine switch, an accelerator pedal, a brake pedal (any thereof is not shown), a steering handle 27 to be described later, and the like are provided inside the cab 5.

The front wheels 6L and 6R are rotatably provided in a lower side of the front portion of the vehicle body 2. The front wheel 6L is arranged in a left side of the vehicle body 2 and the front wheel 6R is arranged in a right side of the vehicle body 2. The left and right front wheels 6L and 6R form part of steering wheels whose steering angles change by steering cylinders 22L and 22R to be described later. Each of the left and right front wheels 6L and 6R is formed having a tire diameter (outer diameter dimension), for example, as much as 2 to 4 meters in the same way as rear wheels 7L and 7R to be described later. The left and right front wheels 6L and 6R are steered by the extending and contracting operations of the steering cylinders 22L and 22R when an operator of the dump truck 1 operates the steering handle 27 to be described later.

The rear wheels 7L and 7R are rotatably provided at the rear portion side of the vehicle body 2. The rear wheels 7L is arranged in a left side of the vehicle body 2 and the rear wheel 7R is arranged in a right side of the vehicle body 2. The left and right rear wheels 7L and 7R form driving wheels of the dump truck 1 and are driven by wheel drive motors 9L and 9R to be described later. The dump truck 1 travels on a road by driving and rotating the left and right rear wheels 7L and 7R.

The engine 8 is provided in the vehicle body 2 to be positioned under the cab 5. The engine 8 is configured by, for example, a large-sized diesel truck. The engine 8 drives a main generator (not shown), and drives and rotates a hydraulic pump 24 to be described later and the like.

The wheel drive motors 9L and 9R are provided in the vehicle body 2 through an accelerator housing (not shown). The wheel drive motor 9L drives the left rear wheel 7L, and the wheel drive motor 9R drives the right rear wheel 7R. The wheel drive motors 9L and 9R are driven and rotated by power supplied through a motor control device 10 from the main generator, and each thereof is constructed by a large-sized electric motor.

The wheel drive motors 9L and 9R each are controlled by the motor control device 10, and are respectively driven and rotated independently. The motor control device 10, based upon a control signal from a controller 30 to be described later, controls rotating speeds of the left and right rear wheels 7L and 7R to be the same at a straight-ahead traveling time of the vehicle and the rotating speeds of the left and right rear wheels 7L and 7R to be different from each other corresponding to a revolving direction at a revolving time.

Next, an explanation will be made of the configuration of a steering device for vehicle 11 that is a major part of the first embodiment with reference to FIG. 2 to FIG. 6.

The steering device for vehicle 11 forms part of a power steering device that can change each direction of the front wheels 6L and 6R that are steering wheels in response to an operation of a steering handle 27 of an operator by a light operating force by use of a hydraulic force. Here, the steering device for vehicle 11 is provided with a steering mechanism 12, a hydraulic circuit 23 for driving the steering cylinders 22L and 22R in the steering mechanism 12, and the steering handle 27 for operating a steering valve 26 of the hydraulic circuit 23, which will be describe later.

The steering mechanism 12 is configured with trailing arms 13L and 13R, struts 17L and 17R, spindles 18L and 18R, and the steering cylinders 22L and 22R.

Figure 4:
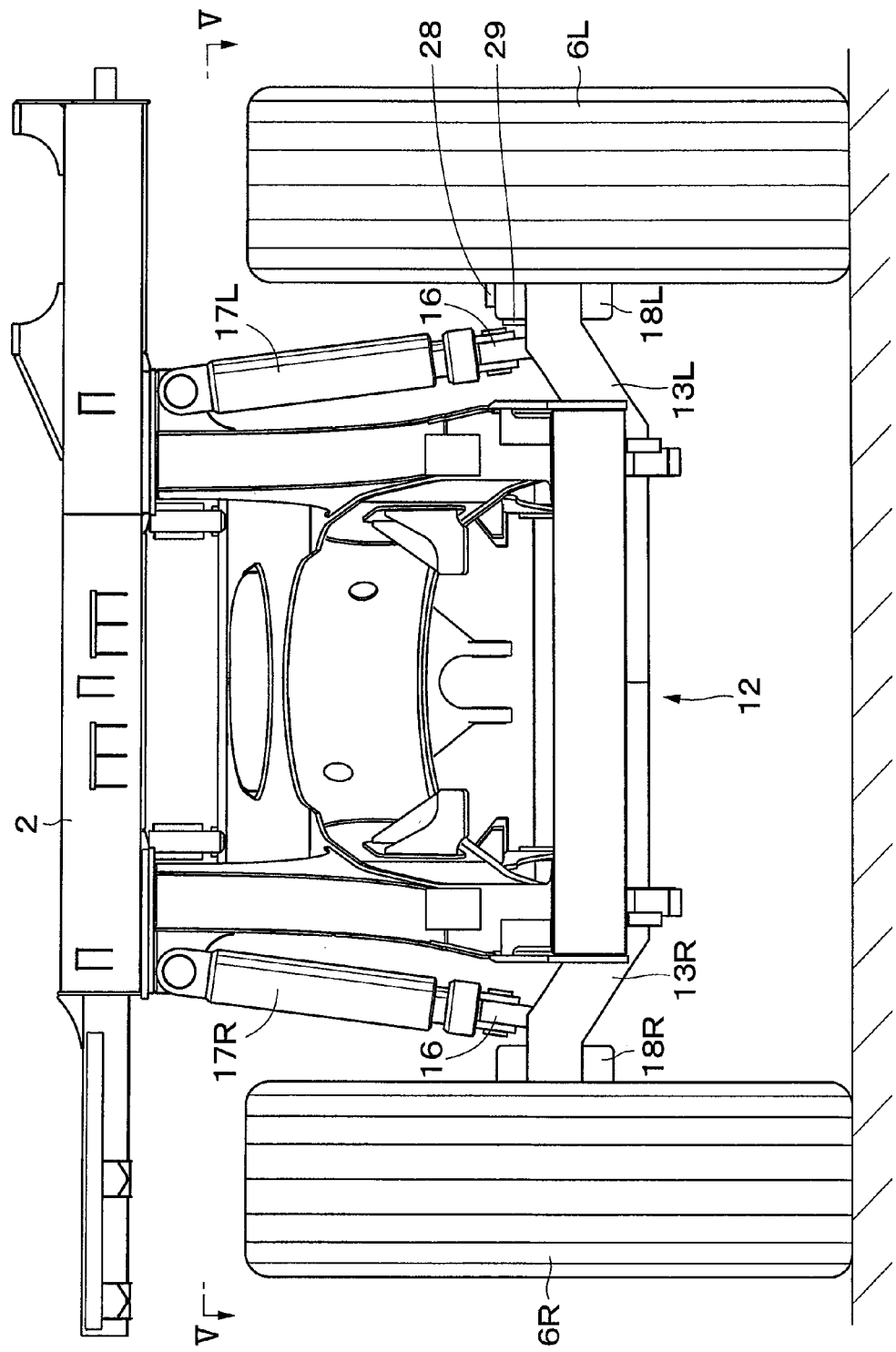
FIG. 4 is a front view showing a vehicle body, front wheels, a steering mechanism, and the like as viewed from a front side.
Figure 5:
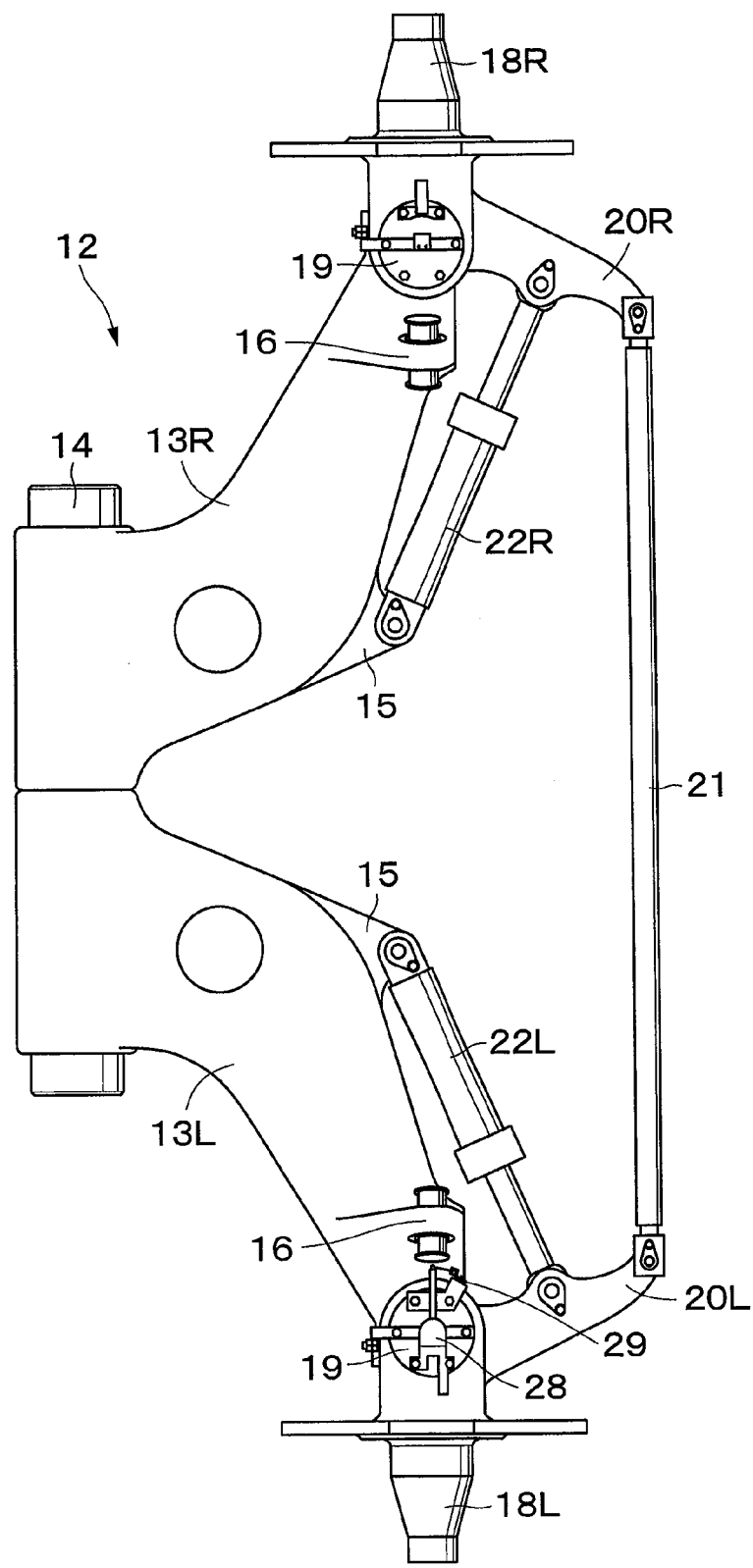
FIG. 5 is a plan view showing the steering mechanism, the rotation angle sensor, the proximity switch, and the like as viewed in a direction of arrows V-V in FIG. 4.
Figure 6:
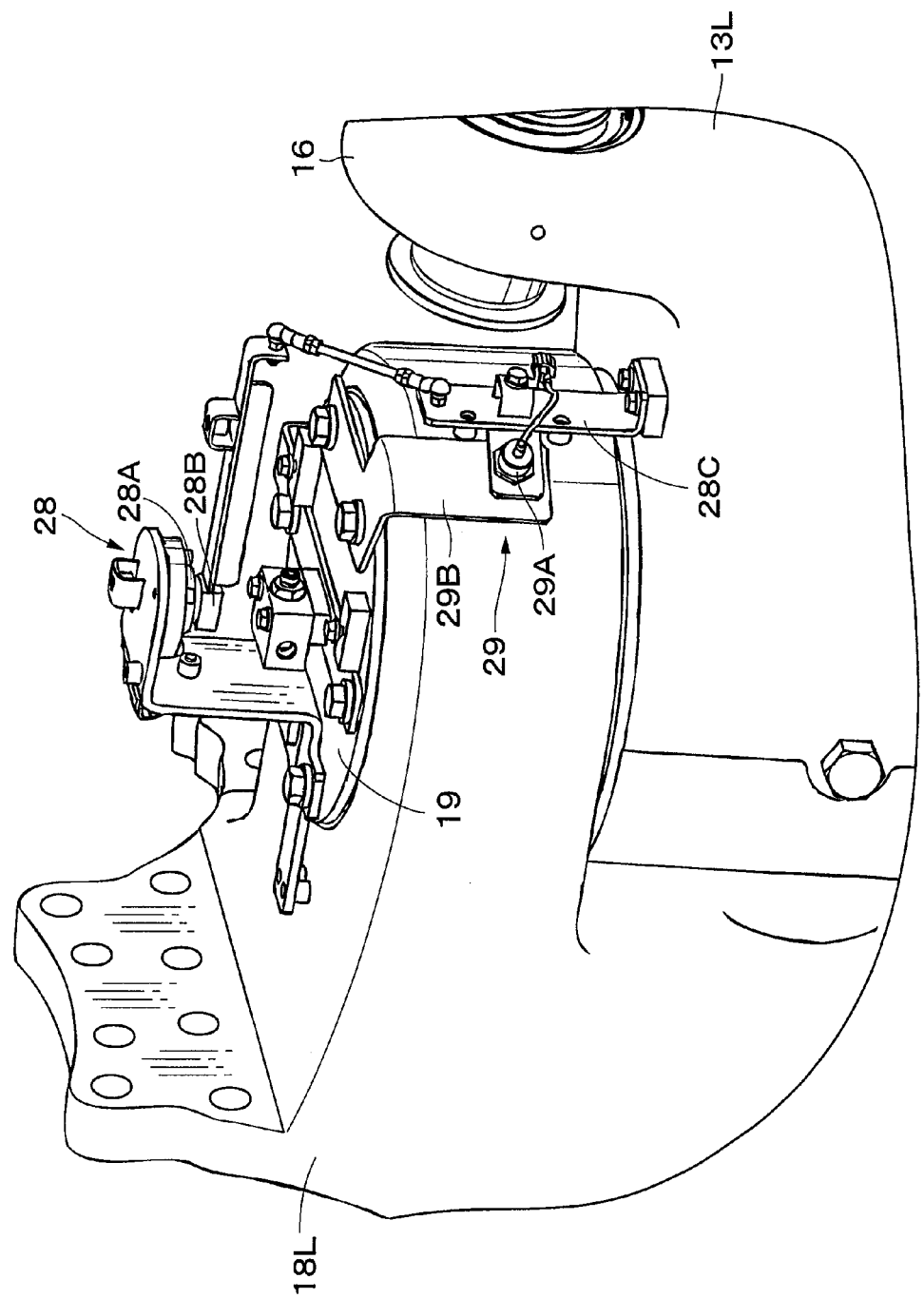
FIG. 6 is a perspective view showing a mounting state of the rotation angle sensor and the proximity switch.

As shown in FIG. 4 and FIG. 5, the trailing arms 13L and 13R are attached through a cross tube 14 as a pivot axis to the vehicle body 2. The cross tube 14 is formed by a cylindrical body extending in a left-right direction across the vehicle body 2. The left trailing arm 13L extends to a backward left outside from the cross tube 14. A base end portion of the left trailing arm 13L is supported by the cross tube 14. Thereby, a tip portion of the trailing arm 13L is displaceable in an upper-lower direction. The spindle 18L is attached to the tip portion of the trailing arm 13L.

A cylinder bracket 15 for mounting the steering cylinder 22L is mounted in the midway position of the trailing arm 13L in the length direction. A strut bracket 16 for mounting the strut 17L is provided near the tip end of the trailing arm 13L.

The right trailing arm 13R is formed bilaterally symmetric to the left trailing arm 13L. Therefore, the cylinder bracket 15 and the strut bracket 16 are provided to the right trailing arm 13R as similar to the left trailing arm 13L and a base portion thereof is supported by the cross tube 14, and the spindle 18R is attached to a tip portion thereof.

The struts 17L and 17R each are formed by a shock absorber using hydraulic pressures or air pressures, for example, and are attached respectively to the left and right sides of the vehicle body 2 to be positioned in a front side thereof. The left strut 17L has an upper end portion attached to the vehicle body 2, and a lower end portion attached to the strut bracket 16 of the trailing arm 13L. Similarly, the right strut 17R has an upper end portion attached to the vehicle body 2, and a lower end portion attached to the strut bracket 16 of the trailing arm 13R.

The spindles 18L and 18R are respectively attached to the tip ends of the trailing arms 13L and 13R, and rotatably support the front wheels 6L and 6R. A king pin 19 extending in the upper-lower direction is provided to be integral with the left spindle 18L, and the left spindle 18L is supported to the trailing arm 13L to be rotatable in the front-rear direction around the king pin 19. A knuckle arm 20L extending backward is provided to be integral with the spindle 18L.

The right spindle 18R is formed bilaterally symmetric to the left spindle 18L. Therefore, the king pin 19 extending in the upper-lower direction is provided to be integral with the right spindle 18R as similar to the left spindle 18L, and the right spindle 18R is supported to the trailing arm 13R to be rotatable in the front-rear direction around the king pin 19. A knuckle arm 20R is provided to be integral with the spindle 18R.

Tip portions of the knuckle arms 20L and 20R are jointed by a tie rod 21. The tie rod 21 and the knuckle arms 20L and 20R form part of a link mechanism. With this link mechanism, the spindles 18L and 18R rotates and displaces such that the front wheels 6L and 6R are inclined in the same direction to each other in the left and right directions.

The steering cylinders 22L and 22R are configured with hydraulic cylinders that extend/contract by supply/discharge of pressurized oil from a hydraulic pump 24 to be described later. The left steering cylinder 22L has a base portion attached to the cylinder bracket 15 of the trailing arm 13L, and has a tip portion jointed to the midway position of the knuckle arm 20L in the length direction. Similarly, the right steering cylinder 22R has a base portion attached to the cylinder bracket 15 of the trailing arm 13R, and has a tip portion jointed to the midway position of the knuckle arm 20R in the length direction.

When one of the steering cylinders 22L and 22R extends, the other thereof contracts. Therefore, the steering cylinders 22L and 22R move the left and right front wheels 6L and 6R in the steering direction to perform a steering operation of the vehicle.

Figure 2:
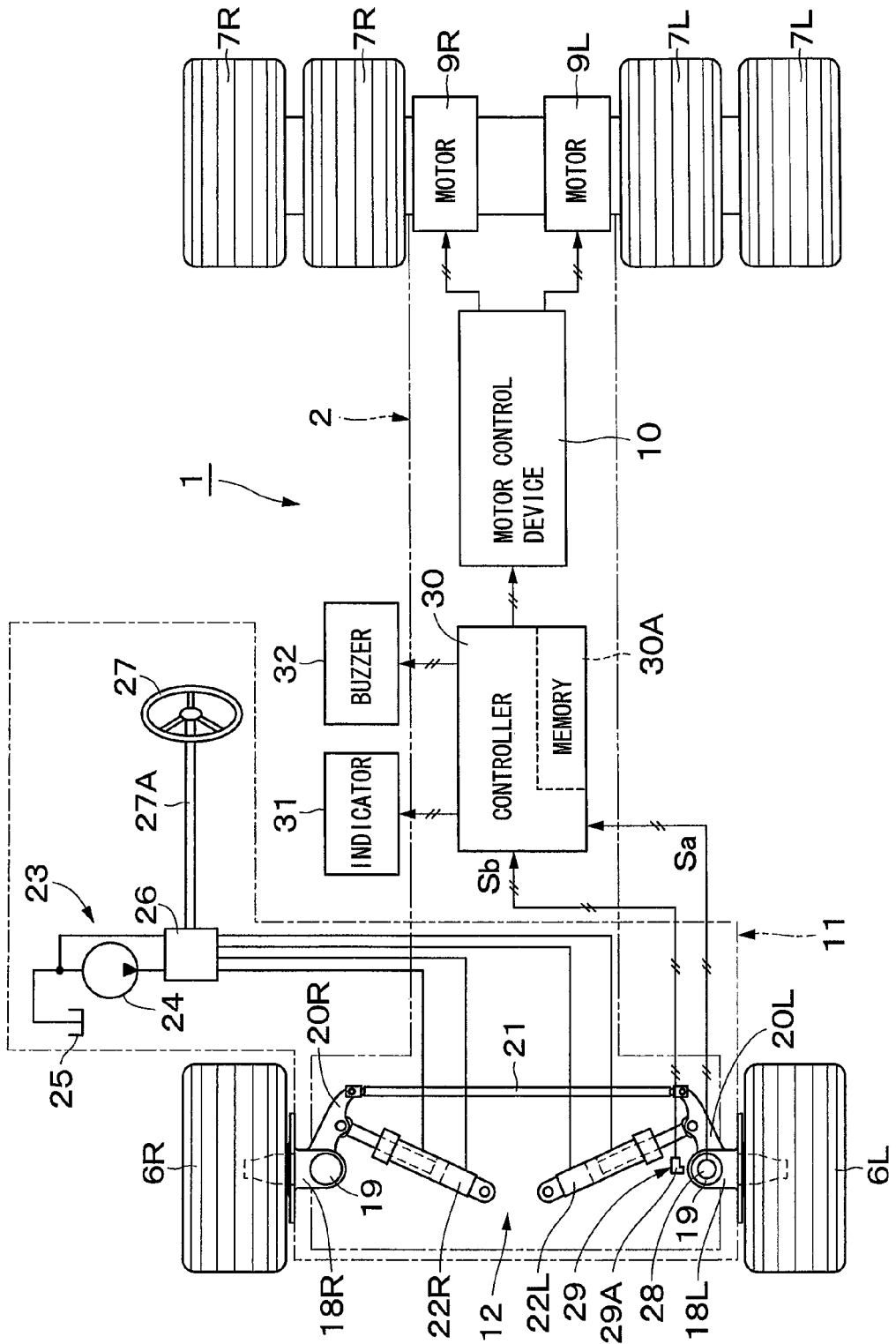
FIG. 2 is a configuration diagram showing the steering device in the dump truck.
Figure 3:
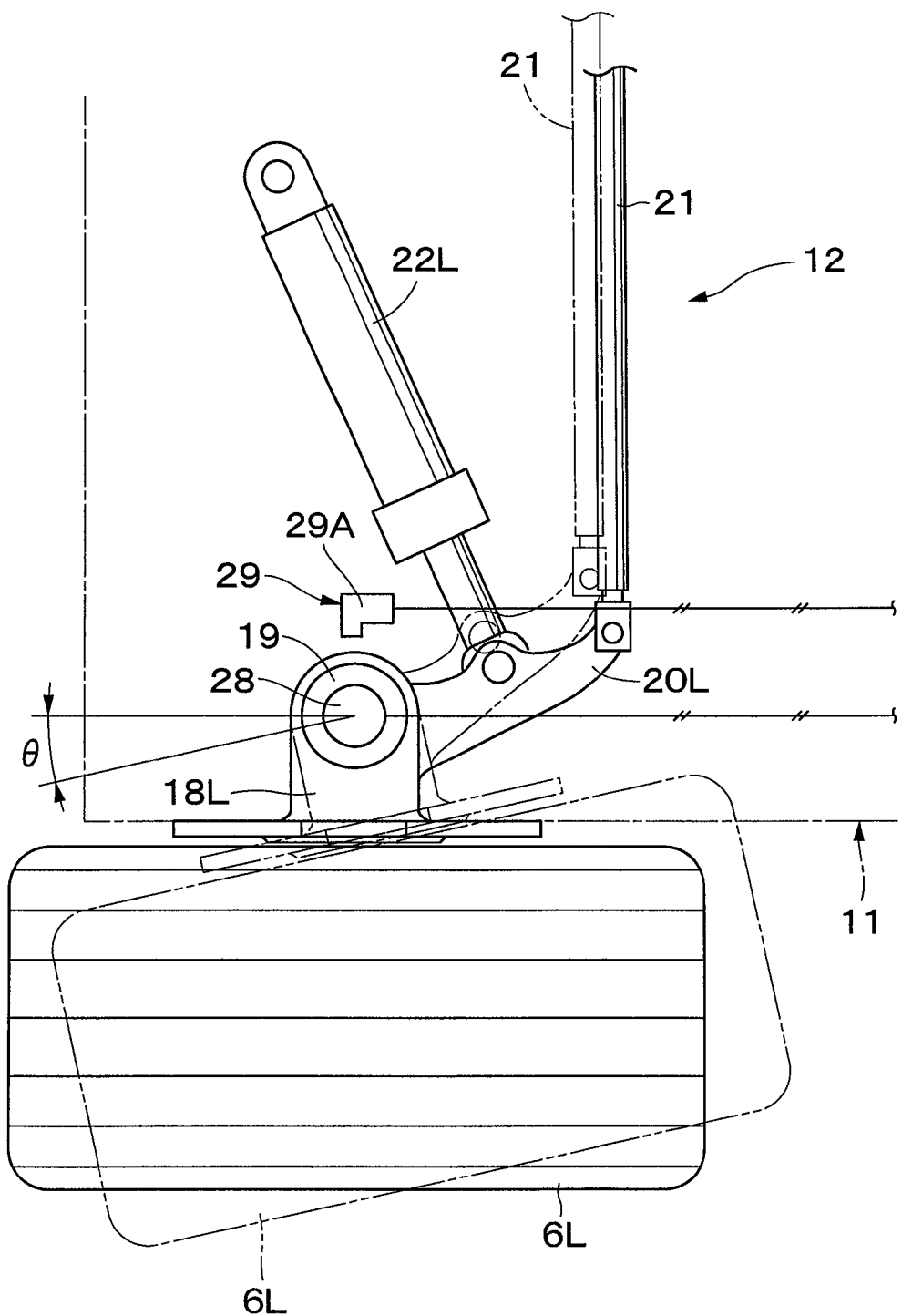
FIG. 3 is an enlarged configuration diagram showing a left side front wheel, a rotation angle sensor, a proximity switch, and the like in FIG. 2.

As shown in FIG. 2, the hydraulic circuit 23 is configured with the hydraulic pump 24 and the steering valve 26, and controls supply and discharge of pressurized oil to the steering cylinders 22L and 22R in response to an operation of the steering handle 27.

The hydraulic pump 24 is provided near the engine 8, and is driven/rotated by the engine 8. The hydraulic pump 24 is connected to an operating oil tank 25 that is attached to a side surface of the vehicle body 2, and delivers pressurized oil to the steering cylinders 22L and 22R, and the like.

The steering valve 26 performs switching control of supply and discharge of pressurized oil to and from the steering cylinders 22L and 22R in response to an operation of the steering handle 27. The steering valve 26 is configured using, for example, a spool valve and the like. The steering valve 26 is jointed to a handle shaft 27A of the steering handle 27, switches supply and discharge of pressurized oil corresponding to a rotating direction of the steering handle 27, and controls a flow amount of pressurized oil in accordance with a rotation angle of the steering handle 27.

The steering handle 27 is provided in the cab 5, a steering operation of which is performed by an operator. The steering handle 27 is gripped by the operator to rotate the handle shaft 27A to left and right, thus performing a steering operation of a vehicle.

Indicated at 28 is the rotation angle sensor for detecting a steering angle θ of the left front wheel 6L, and the rotation angle sensor 28 forms part of a steering angle detecting unit according to the present invention. As shown in FIG. 2 to FIG. 6, the rotation angle sensor 28 is disposed in an upper end side of the king pin 19 of the spindle 18L, and is configured by, for example, an electromagnetic pick-up type rotation angle detector composed of a hall element and a magnet or an optical rotation angle detector composed of a light emitter and a light receiver. The rotation angle sensor 28 is provided with a rotating part 28A that is fixed to the king pin 19 and rotates together with the spindle 18L by steering the front wheel 6L and a fixing part 28B that is fixed to the trailing arm 13L, thus detecting a rotation displacement between the rotating part 28A and the fixing part 28B. Here, the fixing part 28B is attached through a mounting arm 28C to the trailing arm 13L.

Here, when the front wheel 6L is directed in a straight-ahead traveling direction of a vehicle, that is, when the front wheel 6L is in a straight-ahead state in parallel to the front-rear direction, the steering angle θ is zero (θ=0 degrees). When the front wheel 6L is inclined in a direction where a vehicle takes a left turn, the steering angle θ becomes a positive value (θ>0 degrees), and when the front wheel 6L is inclined in a direction where a vehicle takes a right turn, the steering angle θ becomes a negative value (θ<0 degrees). Therefore, the rotation angle sensor 28 thus outputs a steering angle signal Sa in accordance with the steering angle θ of the front wheel 6L. It should be noted that the rotation angle sensor 28 maybe configured to detect a steering angle of the right front wheel 6R.

Indicated at 29 is the proximity switch for detecting whether or not a vehicle is in a straight-ahead travel possible state, and the proximity switch 29 forms part of a straight-ahead state detecting unit according to the present invention. The proximity switch 29 is disposed near the king pin 19 of the left spindle 18L, and is configured by, for example, a proximity switch using a non-contact type electromagnetic pick-up or a hall element. Here, the proximity switch 29 is configured by a detecting part 29A attached to the trailing arm 13L, and a detecting plate 29B attached to the kingpin 19 rotating integrally with the spindle 18L. Therefore, the proximity switch 29 has no degradation due to wear, and is easy to be positioned and attached.

Here, the detecting part 29A of the proximity switch 29 incorporates the aforementioned electromagnetic pick-up or hall element or the like therein. The detecting part 29A is attached to the mounting arm 28C forming the rotation angle sensor 28 near the strut bracket 16 in the trailing arm 13L, and is disposed in a position opposing the spindle 18L horizontally. It should be noted that the detecting part 29A is disposed, for example, closer to the backward side than the strut bracket 16 for preventing interference with the strut bracket 16 or the strut 17L.

On the other hand, the detecting plate 29B is formed of an arc-shaped or flat magnetic metallic plate extending in the upper-lower direction. The detecting plate 29B is attached to the king pin 19 rotating integrally with the spindle 18L, and rotates together with the spindle 18L by steering the front wheel 6L. At this time, the detecting plate 29B is arranged in a position opposing the detecting part 29A to have a minute clearance thereto in a radial direction around the king pin 19. That is, the detecting plate 29B is arranged closer to the outside in a horizontal direction than the spindle 18L around the king pin 19.

Figure 7:
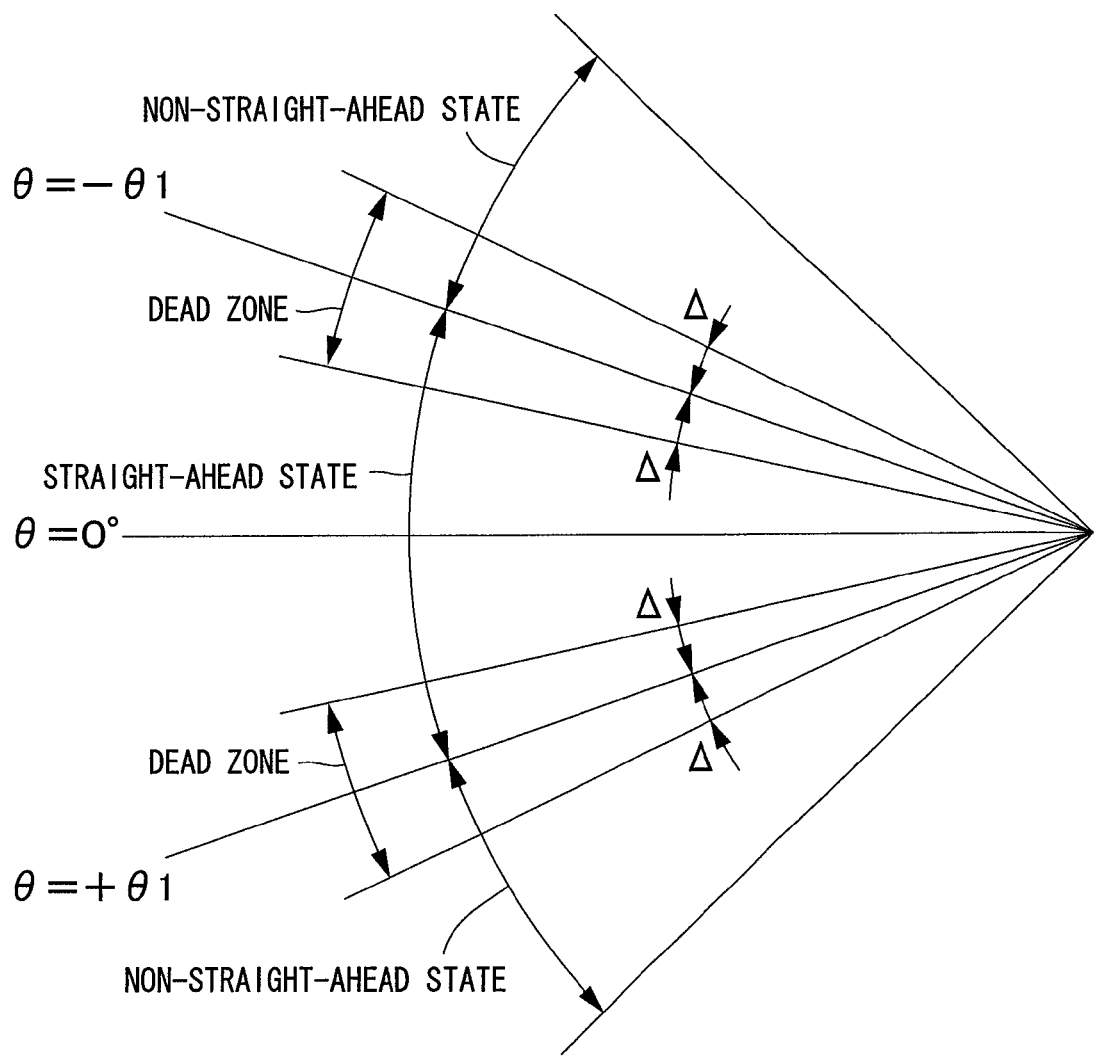
FIG. 7 is an explanatory diagram showing ranges in which the proximity switch performs determinations on a straight-ahead state and a non-straight-ahead state and a dead zone of an abnormality determination.

Here, the detecting plate 29B has a certain length that is in advance determined in the circumferential direction around the king pin 19. The length of the detecting plate 29B in the circumferential direction is determined based upon an angle range of a steering angle θ where the front wheel 6L is in a straight-ahead state. That is, as shown in FIG. 7, when it is determined that the front wheel 6L is in the straight-ahead state where the steering angle θ is in a range of ±θ (−θ1<θ<θ1), the length of the detecting plate 29B in the circumferential direction is determined based upon the range of the steering angle θ (−θ1<θ<θ1). Here, a boundary value θ1 of the steering angle θ is set to, for example, a value in the degree of 10 degrees to 20 degrees (θ1=10 to 20 degrees). In addition, when the front wheel 6L is in a straight-ahead state, the detecting plate 29B opposes the detecting part 29A, and when the front wheel 6L is inclined to be in a non-straight-ahead state, the detecting plate 29B is away from the opposing position to the detecting part 29A.

Therefore, the proximity switch 29 detects whether or not the front wheel 6L is in a straight-ahead state as an ON/OFF signal based upon a magnetic field change when the detecting plate 29B comes close to or is away from the detecting part 29A. Accordingly, the proximity switch 29 outputs a straight-ahead detecting signal Sb composed of the ON/OFF signal to controller 30. That is, the proximity switch 29 outputs the ON signal in a case where the front wheel 6L is in a straight-ahead state, and outputs the OFF signal in a case where the front wheel 6L is inclined to be in a non-straight-ahead state.

It should be noted that the proximity switch 29 is not limited to a switch that detects the magnetic field change, but maybe a switch that detects a change in electrostatic capacitance, light, ultrasonic wave or the like.

Indicated at 30 is the controller that determines abnormality of the rotation angle sensor 28 and the proximity switch 29, and the controller 30 configures an abnormality determining unit according to the present invention. The controller 30 is configured with a microcomputer, and executes an abnormality determining program to be described later. As shown in FIG. 2, an input side of the controller 30 is connected to the rotation angle sensor 28 and the proximity switch 29. On the other hand, an output side of the controller 30 is connected to the motor control device 10, and is also connected to an indicator 31, a buzzer 32 and the like as an alarm unit provided in the cab 5.

The controller 30 performs posture control of a vehicle based upon a steering angle θ detected by the rotation angle sensor 28, for example. As an example, the controller 30 outputs a control signal for controlling the left and right wheel drive motors 9L and 9R to the motor control device 10 based upon the steering angle θ. Thereby, the motor control device 10 controls a rotation speed of the left rear wheel 7L to be the same as a rotation speed of the right rear wheel 7R, for example, at a straight-ahead traveling time of a vehicle based upon the control signal of controller 30, and, on the other hand, differentiates the rotation speed of the left rear wheel 7L from the rotation speed of the right rear wheel 7R in accordance with a revolving direction at a revolving time.

In addition, the controller 30 includes a memory 30A as a memory unit composed of a ROM, a RAM and the like. An abnormality determining program shown in FIG. 8 to be described later and the like are stored in the memory 30A. The controller 30 executes the abnormality determining program, thereby determining whether or not at least one of the rotation angle sensor 28 and the proximity switch 29 is abnormal.

Specifically, when the steering angle θ detected by the rotation angle sensor 28 is different from the detection result on whether to be in the straight-ahead state by the proximity switch 29, the controller 30 determines that at least one of the rotation angle sensor 28 and the proximity switch 29 is abnormal. On the other hand, when the steering angle θ detected by the rotation angle sensor 28 is in accordance with the detection result on whether to be in the straight-ahead state by the proximity switch 29, the controller 30 determines that the rotation angle sensor 28 and the proximity switch 29 both are normal.

The dump truck 1 according to the present embodiment has the above-mentioned configuration and next, an operation thereof will be explained.

In a stone-crushing site as a mine, crushed stones R as objects to be transported are loaded on the vessel 3 by a hydraulic excavator (not shown). The dump truck 1 self-propels to a certain unloading site in a state where a large number of the crushed stones R are loaded on the vessel 3. When the dump truck 1 arrives at the unloading site, an operator in the cab 5 manually operates an operating lever (not shown), thereby extending the hoist cylinder 4 to incline the vessel 3 obliquely backward. Therefore, the crushed stones R in the vessel 3 are discharged from the vessel 3 in such a manner as to slide and fall downward. When discharge of the crushed stones R is completed, the hoist cylinder 4 is contracted to let the vessel 3 down.

When the dump truck 1 travels on a road, an operator in the cab 5 rotates the steering handle 27 in the left or right direction to switch the steering valve 26, thereby supplying pressurized oil to the left and right steering cylinders 22L and 22R. In consequence, the steering cylinders 22L and 22R extend or contract to move the left and right front wheels 6L and 6R in the steering direction.

Each rotation speed of the left and right wheel drive motors 9L and 9R rotating the left and right rear wheels 7L and 7R is independently controlled by the controller 30 at road-traveling. Specifically, when a steering angle signal Sa of the rotation angle sensor 28 is input to the controller 30, the controller 30 rotates the left and right rear wheels 7L and 7R in rotation speeds different from each other in a ratio corresponding to the steering angle θ.

Here, for performing the posture control of a vehicle, it is necessary to obtain information of the steering angle θ of the front wheel 6L with high reliability. Therefore, the controller 30 uses the steering angle signal Sa from the rotation angle sensor 28 and the straight-ahead detecting signal Sb from the proximity switch 29 to determine whether or not the rotation angle sensor 28 and the proximity switch 29 are abnormal.

Figure 8:
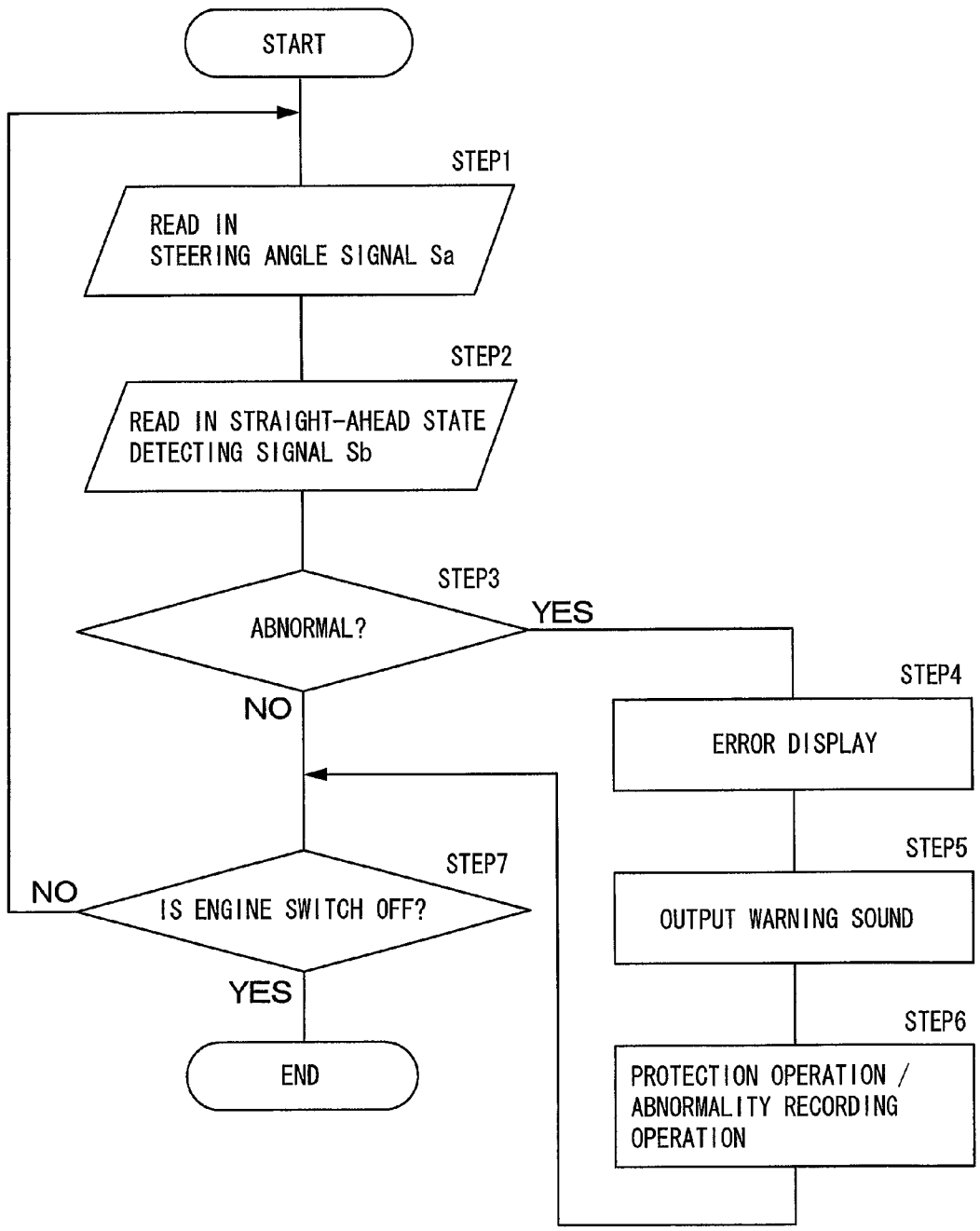
FIG. 8 is a flow diagram showing an abnormality determining program by a controller.

Next, an explanation will be made of the abnormality determining program that is executed by the controller 30 with reference to FIG. 8.

The controller 30 starts by ON of an engine switch (not shown) for starting the engine 8. At this time, the controller 30 executes the abnormality determining program for determining abnormality of the rotation angle sensor 28 and the proximity switch 29.

At step 1, a steering angle signal Sa from the rotation angle sensor 28 is read in to detect a steering angle θ of the front wheel 6L. At step 2, a straight-ahead detecting signal Sb from the proximity switch 29 is read in to detect whether or not the front wheel 6L is in a straight-ahead state.

At subsequent step 3, the steering angle θ and the detection result on whether to be in the straight-ahead state are compared, and it is determined whether or not at least one of the rotation angle sensor 28 and the proximity switch 29 is abnormal. Here, in a range where an absolute value |θ| of the steering angle θ is smaller than a boundary value θ1 (|θ|<θ1), the proximity switch 29 outputs an ON signal in accordance with the straight-ahead state. On the other hand, in a range where the absolute value |θ| of the steering angle θ is larger than the boundary value θ1 (|θ|>θ1), the proximity switch 29 outputs an OFF signal in accordance with the non-straight-ahead state. Therefore, when the steering angle θ is a value close to the boundary value θ1, there is a possibility that the straight-ahead detecting signal Sb tends to easily switch, therefore, in error detecting whether to be abnormal due to a measurement error.

Therefore, as shown in FIG. 7, a dead zone is provided in a range where the steering angle θ is a value close to the positive or negative boundary value θ1. An angle range of the dead zone is a range (θ1±Δ) of a certain dead zone width Δ across the boundary value θ1, for example. Therefore, when the absolute value |θ| of the steering angle θ is within a range shown in the following formula 1, the controller 30 does not make a determination on whether to be abnormal. On the other hand, when the absolute value 1θ1 of the steering angle θ is out of the range shown in the following formula 1, the controller 30 makes a determination on whether to be abnormal.

$$(\theta 1-\Delta)<|\theta|<(\theta 1+\theta) \qquad \text{[Formula 1]}$$

The dead zone width Δ is set in consideration of detection accuracy of the rotation angle sensor 28 or proximity switch 29, assembly accuracy of the spindle 18L and the like, and is set in a range (Δ<θ1) smaller than the boundary value θ1 as needed. As an example, the dead zone width Δ is set in the degree of 3 to 7 degrees. For example, in a case where the boundary value θ1 is set to 11 degrees and the dead zone width Δ is set to 5 degrees, when the steering angle θ is in a range of −6 to −16 degrees or in a range of 6 to 16 degrees, the controller 30 does not make a determination on whether to be abnormal.

On the other hand, when the absolute value |θ| of the steering angle θ is smaller than 6 degrees or when the absolute value |θ| of the steering angle θ is larger than 16 degrees, the controller 30 makes a determination on whether to be abnormal. For example, in a case where the absolute value |θ| of the steering angle θ is smaller than 6 degrees, when the proximity switch 29 outputs an ON signal in accordance with a straight-ahead state, the controller 30 determines that the proximity switch 29 is normal. When the proximity switch 29 continues to output an OFF signal in accordance with a non-straight-ahead state over a predetermined time T, the controller 30 determines that the proximity switch 29 is abnormal.

On the other hand, in a case where the absolute value |θ| of the steering angle θ is larger than 16 degrees, when the proximity switch 29 outputs an OFF signal in accordance with a non-straight-ahead state, the controller 30 determines that the proximity switch 29 is normal, and when the proximity switch 29 continues to output an ON signal in accordance with a straight-ahead state over a predetermined time T, the controller 30 determines that the proximity switch 29 is abnormal.

That is, in a case where a state where the steering angle θ detected by the rotation angle sensor 28 at straight-ahead traveling is different from the detection result on whether to be in the straight-ahead travel by the proximity switch 29 continues over a predetermined time T, or in a case where a state where the steering angle θ detected by the rotation angle sensor 28 at non-straight-ahead traveling is different from the detection result on whether to be in the non-straight-ahead travel by the proximity switch 29 continues over a predetermined time T, the controller 30 determines that at least one of the rotation angle sensor 28 and the proximity switch 29 is abnormal.

It should be noted that the predetermined time T is determined in consideration of a case where the rotation angle sensor 28 or the proximity switch 29 momentarily outputs an error signal by, for example, sand and earth or dust. For example, the predetermined time T is set to a value in the degree of several seconds as needed. As an example, the predetermined time T is set to the degree of three seconds.

When it is determined that there is abnormality at step 3, that is, when a determination of "YES" is made at step 3, the routine goes to step 4, wherein the indicator 31 is used to output an error indicating that the abnormality occurs in any of the rotation angle sensor 28 and the proximity switch 29, and at step 5, the buzzer 32 is used to issue a warning sound (buzzer sound), thus waking an operator. Thereafter, the routine goes to step 6, wherein processes such as deceleration or stop of the wheel drive motors 9L and 9R are executed for protection operation, and the abnormality of the rotation angle sensor 28 or the proximity switch 29 is recorded in the memory 30A as a recording operation, and the routine goes to step 7.

On the other hand, when the determination of abnormality is not made at step 3, that is, when the determination of "NO" is made at step 3, the routine goes to step 7. It should be noted that "when the determination of the abnormality is not made at step 3" corresponds to "when the controller 30 makes the determination of normality", or "when the controller 30 does not make a determination on whether to be abnormal since the steering angle θ is within a range of the dead zone".

At step 7, it is determined whether or not the engine switch (not shown) is switched to OFF. In a case where the engine switch is ON, a determination of "NO" is made at step 7, and the processes starting with step 1 are repeated. On the other hand, in a case where the engine switch is OFF, a determination of "YES" is made at step 7, and a series of the aforementioned abnormality determining processes end.

As described above, according to the first embodiment, the rotation angle sensor 28 that detects the steering angle θ of the front wheel 6L is provided, and the proximity switch 29 that determines whether or not the front wheel 6L is in the straight-ahead state is provided. On the other hand, when the steering angle θ detected by the rotation angle sensor 28 is different from the detection result by the proximity switch 29, the controller 30 determines that one of the rotation angle sensor 28 and the proximity switch 29 is abnormal. Therefore, when the controller 30 makes the determination of the abnormality, the abnormality of the rotation angle sensor 28 and/or the proximity switch 29 can be informed to an operator by using the indicator 31, the buzzer 32 or the like. As a result, inspection, repair replacement or the like of the rotation angle sensor 28 and proximity switch 29 in which the abnormality occurs can be performed to prevent control based upon the erroneous detection result.

The first embodiment determines the abnormality by using the diversified sensors of different kinds form each other, such as the rotation angle sensor 28 and the proximity switch 29. Therefore, even in a case of being used in an environment where sand and earth, powder dust and climate conditions are greatly differ as in the case of the dump truck 1, it is possible to reduce a possibility that the rotation angle sensor 28 and the proximity switch 29 become together in the abnormal state as compared to a case of multiplexing the same kind of sensors, thus making it possible to obtain the information of the steering angle θ of the front wheel 6L with high reliability.

In addition, the proximity switch 29 detects that the front wheel 6L is in the straight-ahead state when the steering angle θ of the front wheel 6L is within a range of a certain boundary value ±θ. At this time, the controller 30 does not make the abnormality determination when the steering angle θ detected by the rotation angle sensor 28 is within a range of a constant dead zone including the boundary value ±θ, and makes the abnormality determination when the steering angle θ is out of the range of the dead zone. Therefore, it is possible to prevent the erroneous determination based upon the detection error of the rotation angle sensor 28 or the proximity switch 29, thus determining the abnormality of the rotation angle sensor 28 or the proximity switch 29 with accuracy.

Further, since the rotation angle sensor 28 and the proximity switch 29 are disposed in the same front wheel 6L in the left and right front wheels 6L and 6R, the rotation angle sensor 28 and the proximity switch 29 perform detection of the steering angle θ and detection on whether to be in the straight-ahead state in the same front wheel 6L. Therefore, the mutual detection error between the rotation angle sensor 28 and the proximity switch 29 can be made small to restrict the erroneous determination based upon the detection error. Further, the wires from the rotation angle sensor 28 and the proximity switch 29 can be together extended to the controller 30, which makes it easier to draw or fix the wires.

Further, since the steering device for vehicle 11 is applied to the large-sized dump truck 1 in which the steering handle 27 are not mechanically jointed to the front wheels 6L and 6R, even when the steering angle of the steering handle 27 is not necessarily equal to the steering angle θ of the front wheel 6L, the information of the steering angle θ of the front wheel 6L with high reliability can be obtained.

Figure 9:
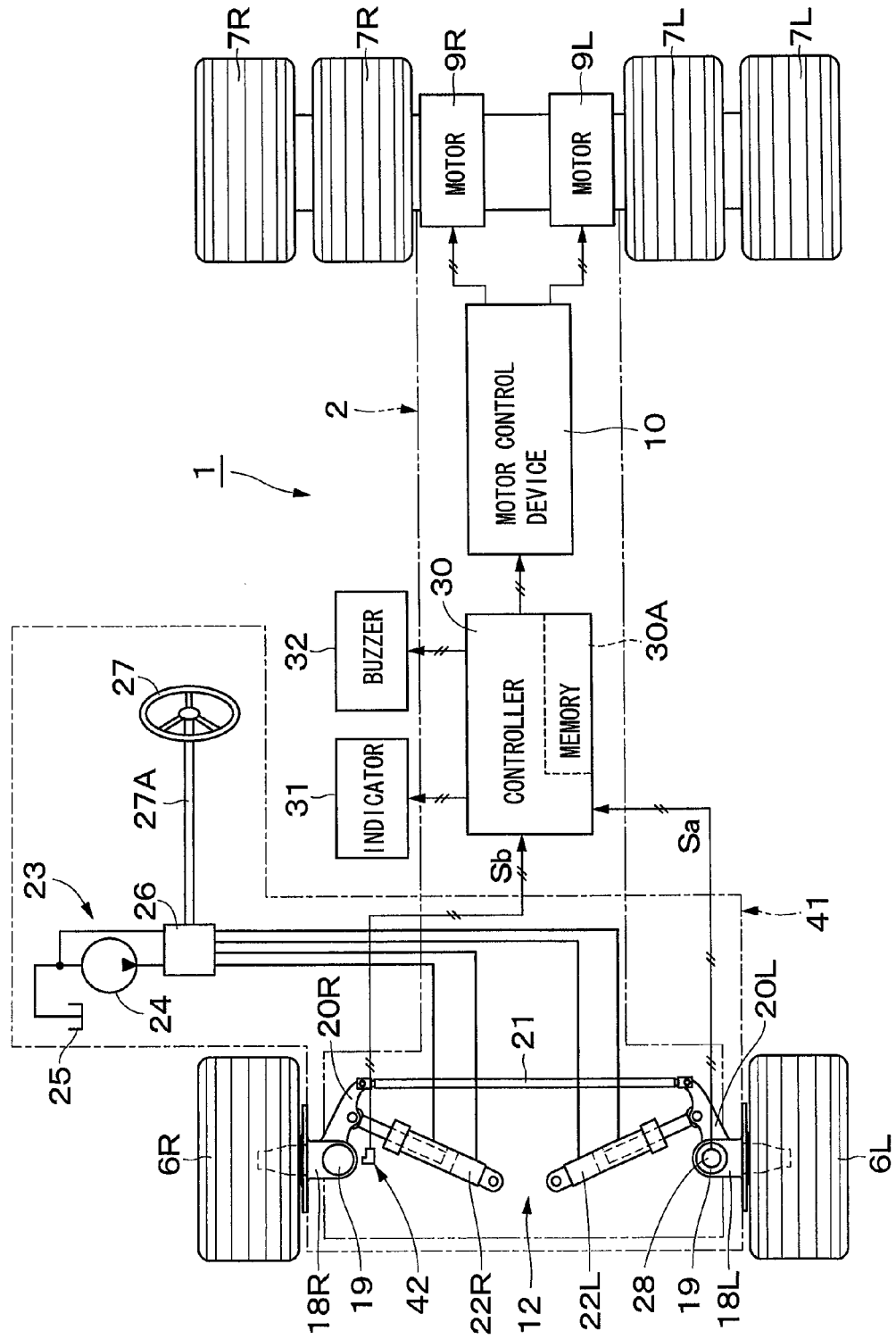
FIG. 9 is a configuration diagram similar to FIG. 2, showing a steering device according to a second embodiment in the present invention.

Next, FIG. 9 shows a second embodiment of the present invention. The second embodiment is characterized in that a rotation angle sensor and a proximity switch each are provided in steering wheels different from each other in left and right steering wheels. It should be noted that in the second embodiment, component elements that are identical to those in the foregoing first embodiment will be simply denoted by the same reference numerals to avoid repetitions of similar explanations.

A steering device for vehicle 41 according to the second embodiment is configured substantially similar to the steering device for vehicle 11 according to the first embodiment. However, the second embodiment differs from the first embodiment in a point where a rotation angle sensor 28 detects a steering angle θ of the left front wheel 6L, and a proximity switch 42 detects whether or not the right front wheel 6R is in a straight-ahead state. It should be noted that the proximity switch 42 is provided in a position bilaterally symmetric to the proximity switch 29 according to the first embodiment, and a detecting part opposes a detecting plate (any thereof is not shown) that rotates/displaces following a steering operation of the front wheel 6R. When the steering angle θ detected by the rotation angle sensor 28 is different from the detection result on whether to be in the straight-ahead state by the proximity switch 42, the controller 30 determines that at least one of the rotation angle sensor 28 and the proximity switch 42 is abnormal.

Thus, also in the second embodiment, the rotation angle sensor 28 and the proximity switch 42 can be used to determine the abnormality of these devices to each other and obtain an operational effect similar to the first embodiment.

On the other hand, since the rotation angle sensor 28 and the proximity switch 42 each are provided in the front wheels 6L and 6R different from each other, the rotation angle sensor 28 and the proximity switch 42 each perform the detection of the steering angle θ and the detection on whether to be in the straight-ahead state in the front wheels 6L and 6R different from each other. Therefore, since the rotation angle sensor 28 and the proximity switch 42 can be disposed away from each other, even when flying stones, sand and earth, or the like collides with the vicinity of the front wheels 6L and 6R, it is possible to restrict that the rotation angle sensor 28 and the proximity switch 42 become in the abnormal state together, thus enhancing the reliability on the abnormality determination. In addition, even when a defect occurs in the tie rod connecting the left and right front wheels 6L and 6R or the like, since the steering angle θ detected by the rotation angle sensor 28 is different from the detection result by the proximity switch 42, a defect of a link mechanism composed of the tie rod and the like can be detected.

It should be noted that in the second embodiment, the rotation angle sensor 28 is disposed in the left front wheel 6L, and the proximity switch 42 is disposed in the right front wheel 6R, but a proximity switch may be disposed in the left front wheel 6L, and a rotation angle sensor may be disposed in the right front wheel 6R.

In the first embodiment, a case where the rotating part 28A of the rotation angle sensor 28 and the detecting plate 29B of the proximity switch 29 are respectively attached to the king pin 19 is shown as an example. However, the present invention is not limited thereto, and the rotating part 28A of the rotation angle sensor 28 and the detecting plate 29B of the proximity switch 29 may be respectively attached to the spindle 18L.

In each of the aforementioned embodiments, a case of using the rotation angle sensor 28 as the steering angle detecting unit is explained as an example, but, for example, a stroke sensor that detects a stroke amount of a steering cylinder may be used as the steering angle detecting unit, and various sensors that can detect a steering angle of a front wheel can be used.

In each of the aforementioned embodiments, a case where the non-contact proximity switch 29, 42 is used as the straight-ahead state detecting unit is explained as an example, but a contact type switch that switches ON/OFF corresponding to a steering angle of a front wheel may be used, and various switches or sensors that can determine whether the front wheel is in a straight-ahead state can be used.

Each of the aforementioned embodiments is explained by taking a case where the steering wheels are the front wheels 6L and 6R as an example, but may be applied also to a case where the steering wheel is a rear wheel.

Each of the aforementioned embodiments is explained by taking the dump truck that is the large-sized transporter vehicle as the vehicle as an example, but the present invention is not limited thereto, and the steering device for vehicle according to the present invention may be mounted to other vehicles such as a small-sized transporter vehicle or a motorcar.

DESCRIPTION OF REFERENCE NUMERALS

1: Dump truck (Transporter vehicle)
2: Vehicle body
3: Vessel (Loading platform)
4: Hoist cylinder
5: Cab
6L, 6R: Front wheel (Steering wheel)
7L, 7R: Rear wheel
11, 41: Steering device for vehicle
12: Steering mechanism
13L, 13R: Trailing arm
18L, 18R: Spindle
19: King pin
20L, 20R: Knuckle arm
21: Tie rod
22L, 22R: Steering cylinder
24: Hydraulic pump
26: Steering valve
27: Steering handle
28: Rotation angle sensor (Steering angle detecting unit)
28A: Rotating part
28B: Fixing part
29, 42: Proximity switch (Straight-ahead state detecting unit)
29A: Detecting part
29B: Detecting plate
30: Controller (Abnormality determining unit)

The invention claimed is:

1. A steering device for vehicle comprising:
a steering handle for an operator to perform a steering operation of a steering wheel;
a steering valve for controlling supply and discharge of pressurized oil in response to the operation of said steering handle;
a steering cylinder for steering a vehicle by the pressurized oil supplied/discharged through said steering valve;
a steering angle detecting unit configured to detect a steering angle θ of said steering wheel;
a straight-ahead state detecting unit configured to determine whether or not said steering wheel is in a straight-ahead state;
an abnormality determining unit configured to, when the steering angle θ detected by said steering angle detecting unit is different from a detection result by said straight-ahead state detecting unit, determine that at least one of said steering angle detecting unit and said straight-ahead state detecting unit is abnormal; and
a steering mechanism for steering said steering wheel that is comprised of a trailing arm having a base side attached to a vehicle body of said vehicle, a spindle that is attached to a tip side of said trailing arm to be rotatable in a front-rear direction to rotatably support said steering wheel, a knuckle arm that is provided in said spindle, and said steering cylinder that is provided between said knuckle arm and said trailing arm to rotate said spindle to said trailing arm,
wherein said steering angle detecting unit comprises a rotating part rotating together with said spindle, and a fixing part that is fixed to said trailing arm to detect a rotating displacement between said rotating part and said fixing part,
wherein said straight-ahead state detecting unit is comprised of a detecting part that is attached to said trailing arm, and a detecting plate that rotates together with said spindle and has a length corresponding to an angle range of the steering angle θ in which said steering wheel is in the straight-ahead state,
wherein said detecting plate opposes said detecting part when said steering wheel is in the straight-ahead state, and is away from a position opposing said detecting part when said steering wheel is in a non-straight-ahead state.

2. The steering device for vehicle according to claim 1, wherein said straight-ahead state detecting unit determines that said steering wheel is in the straight-ahead state when the steering angle θ of said steering wheel is within a range until a certain boundary value in advance determined, and said abnormality determining unit does not perform an abnormality determination when the steering angle θ detected by said steering angle detecting unit is within a range of a dead zone including said boundary value, and performs the abnormality determination when the steering angle θ detected by said steering angle detecting unit is out of the range of said dead zone.

3. The steering device for vehicle according to claim 1, wherein said vehicle is provided with said steering wheels to the left and right, said steering angle detecting unit is composed of a rotation angle sensor for detecting a steering angle θ of one of said left and right steering wheels, and said straight-ahead state detecting unit is composed of a proximity switch for detecting whether or not said steering wheel is in the straight-ahead state, said proximity switch being provided in the same steering wheel side as said rotational angle sensor.

4. The steering device for vehicle according to claim 1, wherein said abnormality determining unit determines that there is the abnormality when the steering angle θ detected by said steering angle detecting unit and the detection result by said the straight-ahead state detecting unit continue to differ over a predetermined time.

5. The steering device for vehicle according to claim 1, wherein said vehicle is provided with said steering wheels to the left and right, said steering angle detecting unit is composed of a rotation angle sensor for detecting a steering angle θ of one of said left and right steering wheels, and said straight-ahead state detecting unit is composed of a proximity switch for detecting whether or not the other of said steering wheels is in the straight-ahead state, said proximity switch being provided in a different steering wheel side from said rotation angle sensor.

6. The steering device for vehicle according to claim 1, wherein said steering device for vehicle is composed of an automotive vehicle body provided with front wheels and rear wheels, a loading platform that is provided on said vehicle body in such a manner as to be tiltable thereon by using a rear side thereof as a fulcrum and on which objects to be transported are loaded, a cab that is positioned in front of said loading platform and is provided in said vehicle body to define an operator's room therein, and a hoist cylinder that is provided between said loading platform and said vehicle body to incline said loading platform backward at the time of discharging said object to be transported from the loading platform, wherein said steering handle is provided in said cab, said front wheel acts as said steering wheel a steering angle θ of which changes by said steering cylinder, and said steering valve is provided in said vehicle body.

* * * * *